Patented Dec. 17, 1935

2,024,987

UNITED STATES PATENT OFFICE 2,024,987

PLASTIC RUBBER DERIVATIVE

Tirey Foster Ford, Akron, Ohio, assignor to The B. F. Goodrich Company, New York, N. Y., a corporation of New York No Drawing. Application September 1, 1933, Serial No. 687,821

14 Claims. (Cl. 260—1)

This invention relates to the preparation of plastics, and particularly to the preparation of hard, tough plastics derived largely from rubber.

The process of this invention consists in inducing a reaction between rubber, an aromatic sulphonic acid, an aldehyde, and a phenol, by heating a mixture of the said materials, whereupon a reaction occurs, giving rise to more or less hard, thermoplastic substances. The invention will be best understood by reference to the following specific examples.

*Example 1.*—100 parts by weight of crude rubber are mixed with 4 parts of trioxymethylene (a polymeric form of formaldehyde), 40 parts of phenol, 4 parts of p-phenol sulphonic acid and 1 part of concentrated sulphuric acid, by milling on an ordinary roll mill or in any other suitable manner. The mixture is heated for 8 hours to a temperature of 135° centigrade in an oven. The product is then washed with hot water on a heated roll mill to remove residual acid. The product is a hard and tough red thermoplastic which softens at a temperature of about 75 to 80° C. and is readily soluble in such solvents as benzene and cyclohexyl acetate.

*Example 2.*—A mixture similar to that of Example 1, but containing 60 parts of phenol when heated and then washed as described above exhibits properties similar to those of the product of Example 1, except that the softening temperature is lower, about 60 to 65° C.

*Example 3.*—100 parts of rubber, 4 parts of trioxymethylene, 30 parts of phenol and 7.5 parts of p-phenol sulphonic acid are mixed and heated and washed as described above. The product is a tough plastic of about the consistency of balata and softens at about 60° C.

The sulphonic acid apparently causes a conversion of the rubber to an isomeric product, and at the same time promotes the reaction of the rubber or its conversion product both with the aldehyde and the phenol. At the same time the aldehyde apparently reacts with the phenol to some extent, forming a condensation product which becomes a part of the product of this invention and renders it more tractable and more readily soluble. The major portion of the acid is later removed after it has served its purpose. The use of a small proportion of sulphuric acid accelerates the reaction and reduces the quantity of the expensive sulphonic acid required.

The conditions of the reaction may be varied over a considerable range. The sulphuric acid may be omitted altogether and the sulphonic acid may be used in quantities of from 3 to 10 or more parts. The aldehyde may be used in quantities of from 2 to 8 or more parts. The phenol may be reduced in quantity to 20 parts or even increased up to 100 parts. The time and temperature of heating may likewise be varied, although a reduction of the reaction temperature to less than about 125° C. is not desirable. At the preferred temperature of 135° C. heating for from 2 to 16 or more hours has been found useful. In general increased proportions of acid and increased time or temperature of heating give rise to harder products with higher softening points and diminished solubility, while increased proportions of aldehyde and phenol have an opposite effect.

Other reagents than those recited in the specific examples may be used. For example, benzene sulphonic acid, toluene sulphonic acid, cresol sulphonic acid, sulphosalicylic acid, dichlorbenzene sulphonic acid and the like may be substituted for the phenol sulphonic acid. Furthermore, aqueous formaldehyde, hexamethylene tetramine, acetaldehyde, butyraldehyde, furfural and the like may be substituted for the trioxymethylene; and other phenols such as the various cresols, xylenols, thymol, naphthol, guaiacol, resorcinol, chlorphenol, nitrophenol and the like may be substituted for the phenol. The rubber may be in the form of ordinary crude rubber, or its equivalents synthetic rubber, gutta-percha, balata, or even vulcanized or reclaimed rubber if the degree of vulcanization and the proportions of fillers are not too high.

The products may be molded under heat and pressure into divers articles, such as buttons, knife handles, phonograph records and electrical insulation, either alone or in admixture with softeners, fillers, etc. They are extremely resistant to corrosive chemicals and therefore are useful as protective coatings or lacquers after solution in an appropriate solvent. They are extraordinarily tenacious adhesives and may be used to adhere rubber to metals or other rigid materials.

While I have herein disclosed with considerable particularity certain preferred manners of performing this invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preparing a rubber derivative which comprises heating a mixture of a preponderant proportion of rubber, a much smaller proportion of an aldehyde and a phenol in the presence of an aromatic sulphonic acid.

2. The method of preparing a rubber derivative which comprises heating a mixture of a preponderant proportion of rubber, a much smaller proportion of an aldehyde, and a phenol in the presence of an aromatic sulphonic acid and sulphuric acid.

3. The method of preparing a rubber derivative which comprises heating a mixture of 100 parts of rubber, from 2 to 8 parts of an aldehyde and from 20 to 100 parts of a phenol in the presence of from 3 to 10 parts of an aromatic sulphonic acid.

4. The method of claim 3 in which the product is washed substantially free from acid after heating.

5. The method of preparing a rubber derivative which comprises heating a mixture of a preponderant proportion of rubber, a much smaller proportion of trioxymethylene and a phenol in the presence of an aromatic sulphonic acid.

6. The method of preparing a rubber derivative which comprises heating a mixture of a preponderant proportion of rubber, a much smaller proportion of an aldehyde and a phenol in the presence of p-phenol sulphuric acid.

7. The method of preparing a rubber derivative which comprises heating a mixture of a preponderant proportion of rubber, a much smaller proportion of trioxymethylene and phenol in the presence of p-phenol sulphonic acid and sulphuric acid.

8. The method of preparing a rubber derivative which comprises heating a mixture of 100 parts of rubber, from 2 to 8 parts of trioxymethylene and from 20 to 100 parts of a phenol in the presence of from 3 to 10 parts of p-phenol sulphonic acid.

9. The method of preparing a rubber derivative which comprises heating a mixture of 100 parts of rubber, from 2 to 8 parts of trioxymethylene and from 20 to 100 parts of phenol in the presence of from 3 to 8 parts of p-phenol sulphonic acid.

10. A plastic rubber derivative resulting from the heating of 100 parts of rubber, 2 to 8 parts of an aldehyde and 20 to 100 parts of a phenol in the presence of an aromatic sulphonic acid.

11. A plastic rubber derivative resulting from the heating of 100 parts of rubber, 2 to 8 parts of an aldehyde and 20 to 100 parts of a phenol in the presence of an aromatic sulphonic acid and sulphuric acid.

12. A plastic rubber derivative resulting from the heating of 100 parts of rubber, 2 to 8 parts of formaldehyde and 20 to 100 parts of a phenol in the presence of an aromatic sulphonic acid.

13. A plastic rubber derivative resulting from the heating of 100 parts of rubber, 2 to 8 parts of formaldehyde and 20 to 100 parts of phenol in the presence of an aromatic sulphonic acid.

14. A plastic rubber derivative resulting from the heating of 100 parts of rubber, 2 to 8 parts of formaldehyde and 20 to 100 parts of phenol in the presence of an aromatic sulphonic acid and sulphuric acid.

TIREY FOSTER FORD.